United States Patent [19]
Wasko

[11] Patent Number: 5,887,581
[45] Date of Patent: Mar. 30, 1999

[54] HANGERED BARBEQUE ASSEMBLY

[76] Inventor: Edward Stanley Wasko, 682-26 1/16 St, Goodview Rd., Chetek, Wis. 54728-6304

[21] Appl. No.: 36,441

[22] Filed: Mar. 6, 1998

[51] Int. Cl.⁶ ...................................................... F24B 3/00
[52] U.S. Cl. ............................................................ 126/25 A
[58] Field of Search ................................ 126/25 R, 25 A

[56] References Cited

U.S. PATENT DOCUMENTS

| | | | |
|---|---|---|---|
| 47,176 | 4/1865 | Wetmore . | |
| 2,048,769 | 7/1936 | Anderson | 126/29 |
| 2,201,756 | 5/1940 | Avetta | 126/30 |
| 2,441,190 | 5/1948 | Fuller | 126/25 |
| 2,619,951 | 12/1952 | Kahn | 126/25 |
| 2,709,996 | 6/1955 | Tescula | 126/25 |
| 2,774,345 | 12/1956 | Peplin | 126/25 |
| 2,821,187 | 1/1958 | Tescula | 126/25 |
| 2,828,733 | 4/1958 | Moore, Jr. | 126/25 |
| 2,962,019 | 11/1960 | Lundgren | 126/25 |
| 3,389,651 | 6/1968 | Schultz | 99/393 |
| 3,421,433 | 1/1969 | Vitale | 99/340 |
| 3,550,525 | 12/1970 | Rabello . | |
| 3,604,408 | 9/1971 | Tescula . | |
| 4,619,190 | 10/1986 | Smith . | |

*Primary Examiner*—Carroll B. Dority
*Attorney, Agent, or Firm*—Loyd W. Bonneville

[57] ABSTRACT

A barbeque assembly comprising a vertically disposed heating bed with one or more aerating faces and both attached and emplaceable hanger rods upon which one or more food clamping grills and baskets may be hung for outdoor barbeque cooking.

5 Claims, 1 Drawing Sheet

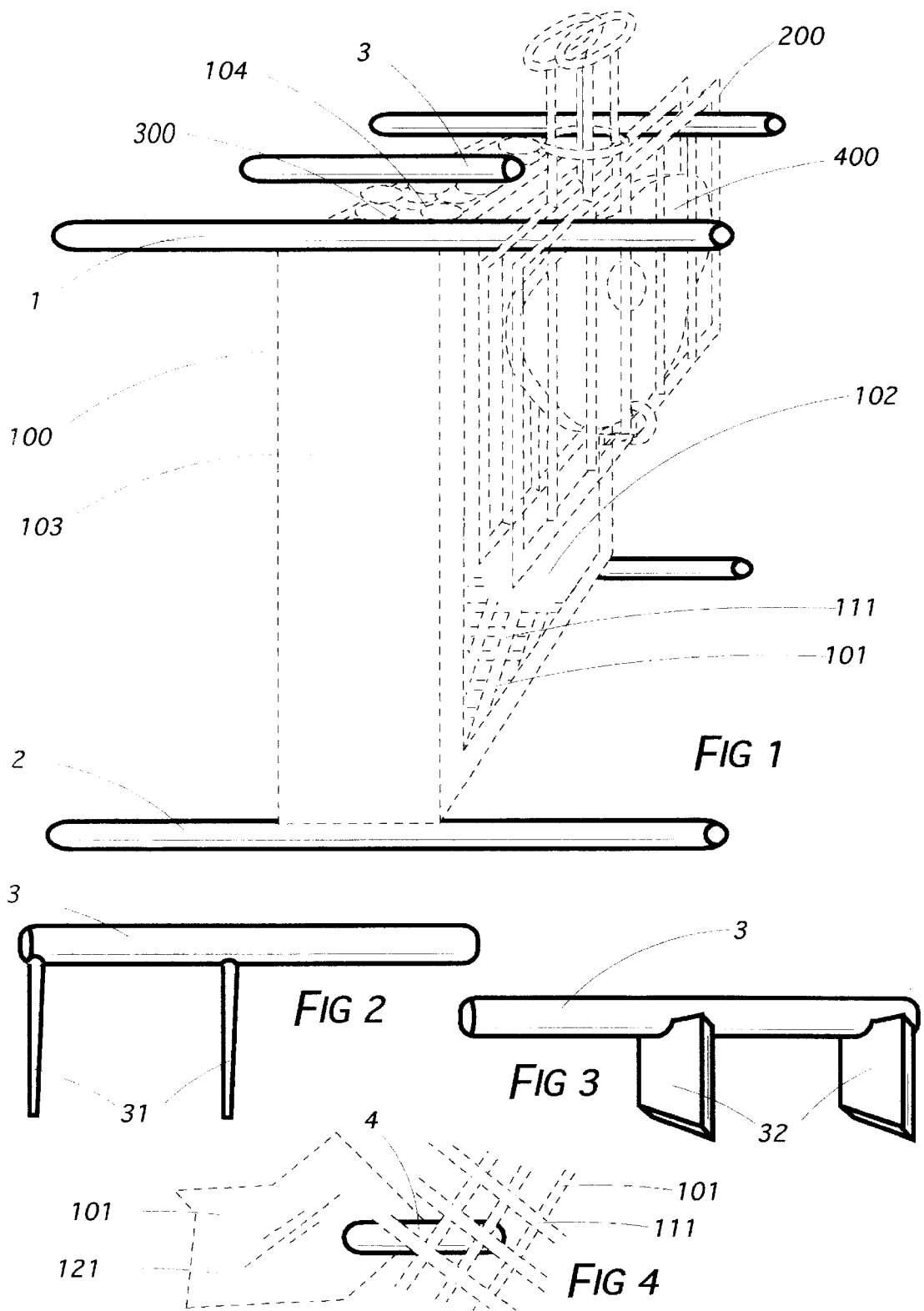

HANGERED BARBEQUE ASSEMBLY

BACKGROUND OF THE INVENTION

1. Field of the Invention Outdoor cooking units; picnic supplies

2. Description of the Prior Art

Occasionally a descriptive term in this application may be shortened so as to recite only a part rather than the entirety thereof as a matter of convenience or to avoid needless redundancy. In instances in which that is done, applicant intends that the same meaning be afforded each manner of expression. Thus, the term aerating heating bed face (101) might be used in one instance but in another, if meaning is otherwise clear from context, expression might be shortened to heating bed face (101) or merely face (101). Any of those forms is intended to convey the same meaning.

The term emplace or any of its forms when used in this application means the joining of two objects or parts so as to unite them in a reasonably easily removable way, such as the positioning of a span shortening hanger rod (5) into the heating chamber's open top (104) from which it (5) may be removed, discussed ante. Where the term is employed, rigid emplacement connotes the meaning that the object is removable but only with some degree of difficulty, such as might be encountered in separating two parts—for example, a pin from a socket in which it is held in position by compression of a spring. The word emplace is also consistent in meaning with the word "detachable" as occasionally used in connection parlance but not in this application, since it is derived from the root attach. The term attach or fasten or any of their forms when so used means that the juncture is of a more or less permanent nature, such as might be accomplished by nails, screws, welds or adhesives. Employment of the words connect or join or any of their forms is intended to include the meaning of both in a more general way.

Outdoor cooking evolved from the discovery of fire. It would be only a matter of time before food would be positioned with respect to the fire by means of one apparatus or another to enhance preparation. Even the more refined art of recreational barbeque cooking itself, as the outdoor or picnic pastime we know it to be today, was practiced more than a century ago. Like all other recreational endeavors, improvements in devices for the sake of convenience have continually been sought after. Construction of ovens around the heating source permitted meritworthy cooking and baking results by entrapping the heat. Those structures, in turn, led to notions of portability and toolbox like barbeque sets which could be neatly stowed when not in use.

There is a lore to outdoor cooking, however, which those more elaborate devices fail to satisfy. There are many who would forego them for the thrill of creating, as it were, a palatable delight from naught but the bare essentials of life. There is, thus, a sport in the undertaking calling upon one's skill and experience to do it properly. Yet, convenience concerning such matters as the food's emplacement with respect to the heat, the number of cooking sites available on the barbeque cooker and the cleanup required after the cooking is done are always appreciated by even the most rugged outdoor folk.

The price of simplicity, however, has generally taken its toll upon the food by charring it badly and, as we more recently have come to realize, upon its consumers, whose health undesired carcinogens imperil. The object of innovation in such matters, therefore, has been to build a barbeque cooker simple in construction but one which, nevertheless, diverts smoke and unpleasant substances from the food itself.

Over the decades, a number of cookers varying considerably in degrees of simplicity were developed which separated the food from heating source. It should be understood that there are a considerable number of devices in the prior art which would be relevant to this application but for the fact that they, fully or in part, are oven-like enclosed structures. This application avoids any references to them because they entail reflective radiation and heat entrapment in the cooking process, principles foreign to those inherent in applicant's invention. Open air barbeque cookers were devised at prior art, however, which like applicants, comprise a vertically disposed heating bed from which heat is radiated outward upon food suspended in place before the bed. Other historical devices this application does not address include cookers, whether with vertical heating beds or otherwise, which also included spits made to revolve either manually or by electric power. Nor does this application address electrically heated appliances comprising vertical heating units which otherwise, like an electric toaster, have historically been created for and used with hanging grills in the manner applicant's invention does.

Some of the vertical bed cookers of prior art include a single rod-like extension upon which food grills are hung in reasonable proximity of the fire for cooking. The single protruding rod provided a hanging site upon which some part, usually the handle, of a food clamping grill—typically a hinged hand-held wire construction in which the food is clamped in place—was to be hung. More often, two such rods are present so that the bottom edge of the grill—a lengthier part thereof—may more conveniently be hung upon the rods in two-point support to position its contents at a higher elevation. Moreover, two such rods installed to project at both forward and rear faces of the heating bed—that is, in two directional extension—permit cooking at both faces simultaneously.

There is merit in the prior art vertical bed arrangement, since not only are the barbeque coals exposed considerably to the air, permitting it to pass freely through them but, even more advantageously, the smoke and undesirable carcinogens are diverted upward instead of toward the food hung to the side for cooking. That need was, thus, addressed even before much about carcinogens had been learned.

It appears that the difficulty in using the prior art vertical heating bed devices lies in a preoccupation with the then and now popular hand-held grill, an object whose size—partly to maximize the quantity of food to be cooked and partly for the safety of those who hold it—is considerable. Even the ones presently extant measure perhaps as much as two feet in length from handle to hinge. The span between the prior art paired hanger rods was great enough to accommodate the dimensions of such hand-held grills. Other than his own, applicant is aware of no vertically disposed barbeque cooker which disposes a pair of hanger rods in such manner as to permit smaller grills or baskets to be hung from two points upon them.

To attach a multiplicity of rods upon a cooker to fill this need would unduly clutter its construction, since a manufacturer cannot possibly anticipate the span required in one case or another. As explained ante, applicant's assembly as preferably embodied includes a separate hanger which is configured with means to emplace it into the top of a cooker at any selected point along the span between two rods attached at each upper corner thereof. That particular element of the inventive assembly which is the subject of this application has, therefore, been designated a span shortening hanger rod.

For outdoor cooking purposes, there is no compelling need for extra hardware comprising pans or trays to collect spent ashes. Where such pans are provided for in a completely unenclosed cooker, it is generally necessary to provide legs or other supporting structures below the heating bed. Ashes have been traditionally cooled down with a water hose at a preselected barbeque area or deposited in a suitable waste site. One may, therefore, dispense with underlying legs or other supporting structures which otherwise add to the cost of manufacture and often make a cooking unit tippy. If the cooking is done in an area in which one is not particularly concerned about dripping grease, it may merely be permitted to fall onto the ground. Grease collection may be considered appropriate in other instances for environmental or other reasons. Accordingly, one may exercise discretion in emplacing a pan beneath food suspended to the side of a vertical heating bed.

U.S. Pat. No. 4,619,190 issued to Smith features a collapsible frame, the upper horizontal parts of which may serve somewhat in the manner as projecting hanger rods. They are provided with an undulating or wavy configuration presumably to enhance emplacement of cooking accessories in a secure manner. Because there is no projecting end to those parts, however, special hooks or other structures would have to be included to hang something from them. More importantly, while the upper frame parts upon assembly permit outward movement of a grill to displace it a selected distance from the heat, no means are provided to shorten the hanger span to accommodate smaller grills or baskets. Moreover, the framework appears to snap together by means of spring clamps and, therefore, does not share the advantages of simplified one-piece configuration. Although not immediately obvious, it should also be recognized that the device is actually disclosed as an enclosed oven-like structure. U.S. Pat. No. 3,604,408 issued to Tescula comprises a wire construction in which the same wire is formed to comprise Y shaped legs to raise the vertical heating bed off the ground as well as to comprise the hanger rods. It appears to function much in the manner of applicant's invention since it provides for selected position displacement of the food from the heat. However, there is no provision for selected lateral adjustment such as applicant's span shortening hanger rod addresses. U.S. Pat. No. 3,550,525 issued to Rabello illustrates a V shaped heating bed upon an assembled framework. The hanger rods disclosed appear to comprise reinforcement rods—often referred to as "rerods"—which by reason of their uneven or bumpy configuration, enhance security of emplacement of cooking utensils upon them. The rods provide for adjustment in outward displacement of food from heat but not for shortening the lateral span between them. U.S. Pat. No. 3,421,433 issued to Vitale consists of a vertical heating bed which is pivotable to a horizontal position. Its hanger rods are themselves pivotable within certain limits and, therefore, permit only slight adjustment for laterally shortening the hanging span. The pivotable leg structure also apparently made it necessary to limit the length of the rods to avoid the hazard of tipping. Therefore, outward displacement appears to have been somewhat compromised. U.S. Pat. No. 3,389,651 issued to Schultz comprises a folding X shaped frame which disposes the heating bed upon one limb of the X and the food grill upon the other. Dripping grease follows an adherence path. Outward displacement of food from heat along the limbs is feasible but appears to be much more limited than would be the case with hanger rods. U.S. Pat. No. 2,962,019 issued to Lundgren features a device comprising H shaped construction permitting a vertical heating bed to be oriented horizontally for cooking purposes. Such configuration sometimes also permits the operator to tip the device upon the lower pair of limbs to facilitate lighting the coals. Lundgren's H configuration permits parts thereof to be employed as heat reflectors and makes outward displacement of the food from the heat feasible within certain limits. No intermediate lateral span positioning is provided for, however. U.S. Pat. No. 2,828,733 issued to Moore comprises a more primitive heavy wrought iron or steel construction in which the heating grates are separated and the food grill is hung in a fixed outward location. The device, therefore, provides neither for outward displacement of food from heat nor lateral span variations. U.S. Pat. No. 2,821,187 issued to Tescula discloses a table like structure in which a series of vertical heating beds and food grills are mounted. Some displacement of food from heat is accomplished by moving one or the other of the units along a rail. No lateral span adjustment for smaller grills or baskets is provided for, however. U.S. Pat. No. 2,774,345 issued to Peplin bears a strong resemblance to the first of the Tescula devices supra except that horizontal orientation of the otherwise vertical heating bed is possible. The same comments made with reference to Tescula are relevant concerning this device. U.S. Pat. No. 2,709,996 issued to Tescula illustrates a table-like device with wheels with hanger rods providing for displacement of food from heat but fixed for lateral span distance. U.S. Pat. No. 2,619,951 issued to Kahn features a vertical heating bed which pivots upon a wire stand to horizontal. A handle framework loop may be pivoted into place to provide for laterally sliding upon it smaller food grills or baskets hung by means of hooks. Outward displacement of food from heat is fixed in distance, however. U.S. Pat. No. 2,441,190 issued to Fuller comprises a device suggestive of that of Moore, supra, in which both outward displacement of food from heat is limited and lateral span adjustment for smaller food containers is not provided for U.S. Pat. No. 2,201,756 issued to Avetta constitutes another relevant model. Among other things, to strengthen the structure, it includes a cross brace situated above the heating bed upon a framework which heightens the structure beyond that necessary for the vertical bed's operation. While the Avetta device provides for outward displacement upon rods of food from heat, there is no provision for lateral span adjustment. U.S. Pat. No. 2,048,769 issued to Anderson is suggestive of the first of the Tescula devices supra but its hanger rods extend outward openly only upon one of the two faces of the heating bed. To suspend it off the ground, it also comprises wire legs which may be adjusted to permit horizontal orientation of the heating bed. No lateral span adjustment is provided for. U.S. Pat. No. 47,176 issued to Wetmore is an early construction providing for a vertical heating bed with a notched arm to permit outward displacement of food from heat. As with the devices discussed supra, lateral span adjustment for smaller food containers is not provided for.

All of the foregoing feature in common the objective of disposing the heating bed in open air vertical orientation with radiation of heat toward the food at the side. While many of them provide for outward displacement of the food from the heat, often by sliding the food grill upon rods, none comprise one-piece bed and special rod construction providing for lateral adjustment of rod span to allow two-point hanging emplacement of smaller food grills or baskets. In summary, the needs or objectives pointed out supra thus far remain only partly addressed in the prior art and some have not been met at all.

SUMMARY OF THE INVENTION

A pair of hanger rods are attached to the uppermost corners of a vertically disposed heating bed and oriented to project outward from the bed's face to permit adjustment in displacing a food grill at selected positions nearer to or farther from the heat.

The invention comprises in addition to objects known to the prior art a span shortening hanger rod with prongs or plates which permit emplacement in and lateral adjustment along the open top of the vertical bed. The span between rods is thereby reduced so that grills or baskets smaller than those otherwise used may be hung in two-point suspension before the face of the heating bed.

BRIEF DESCRIPTION OF THE DRAWINGS

Solid lines in the drawings represent the invention. Dashed lines represent prior art.

FIG. 1 represents a partially cut-away perspective view of the invention.

FIGS. 2 and 3 illustrate a span shortening hanger rod,

FIG. 2 disclosing span shortening anchor prongs and FIG. 3, span shortening anchor plates.

FIG. 4 is a partially cut-away perspective view illustrating a cross brace attached between the two heating bed faces of the invention which there comprise, instead of two aerating faces, but one of them and a reflector plate.

DESCRIPTION OF THE PREFERRED EMBODIMENT

The invention may be considered in two different ways. In one sense, it may be considered in large part to comprise a combination of objects known to the prior art with certain other specific objects added to them so as to disclose a new composite entity. In another sense, it may be considered by reason of the added objects to comprise a novel improvement to a known prior art entity.

The subject of this application is a barbeque assembly comprising in part a vertically disposed heating bed (100) and a pair of horizontally projecting hanger rods (1) upon which a food grill (200) may be emplaced in two-point suspension and slid along the length of the rods (1) toward or away from the heat source.

The vertically disposed heating bed (100) referred to supra comprises the barbeque cooker's heating source. It (100) is box-like, comprising the shape of a thickened rectangle or a flattened cube and oriented to stand upon an edge extending upward. The bed (100), therefore, has two comparatively expansive faces (101) and a relatively narrow bottom plate (102), ends (103) and top (104). The top (104) is left open so that barbeque coals (300) may be loaded into it (104) for cooking.

While the foregoing constituents are already known to the prior art, the rods (1) of the invention are horizontally attached, as that term is defined supra, such as by welding, rather than being merely emplaced thereon, rigidly or otherwise, supra, as would be the case if they (1) were inserted into a network of tabs or spring fasteners. The terminology two-point suspension means that a food grill (200) such as a rack, basket or other container is provided with two points on the barbeque assembly to hang from. The two hangers (1), thus, project through openings in the grill (200) which are well separated from one another.

Optionally, a cross brace (4) may be attached transversely between the vertical bed's faces (101) as shown in FIG. 4 to assure additional strength.

The hanger rods (1) are disposed to extend outward from the heating bed (100) in a direction normal or at right angles to the bed's opposing faces (101). The terminology referring to horizontal attachment means that attachment of the hanger rods (1) is at sites which require that they (1) extend straightly and horizontally from or across them. The rods (1) do not, for example, comprise L shaped configuration entailing attachment of one of the legs of the L shape vertically along a side of the heating bed (100) as was the case in certain prior art cookers. The requirement for straightness and horizontal attachment permits one to attach a single rod (1) generally at its midsection so that it extends outward from both of the opposing bed faces (101), which when made to comprise aerating faces (111), discussed ante, permit food (300) to be cooked at both sides of the bed (100) simultaneously. While two-sided use was also provided for in some of the prior art devices, they did not entail the simplicity and economy in manufacture provided by the invention's solidly attached straight rods (1).

Because of the inclusion of hanger rods (1), the invention is spoken of herein as a hangered barbeque assembly. The hanger rods (1) are limited in their (1) composition only in that they (1) comprise heat resistant solid material or tubing. It is preferable that solid rodding be employed and also that it be of the sort known generally as reinforcement rod, or "rerod"—that is, a heat resistant extension such as metal having the widely recognized generally braided rope strand configuration. Its use allows for economy in manufacture, strengthens the structure and provides an uneven or bumpy configuration which enhances secure emplacement of cooking utensils upon it.

The requirement that a hanger rod (1) be oriented generally normal to the face (101) of the heating bed (100) merely follows the traditional meaning that the direction of the rod's (1) extension away from either of the bed's faces (101) is disposed generally at right angles to the plane defined by the face's (101) surface. The rods (1) attachment is further stated herein to be disposed at the uppermost corners of each heating bed face (101). By this is meant that the rod (1) be attached so as to lie across the outer edges of the bed's top (104), the point at which the bed's top (104) intersects or meets its opposing ends (103). Such disposition permits attachment at the rod's (1) midsection along the corner edge for one-piece two-directional extension of each rod (1) as alluded to supra.

In a preferred embodiment, the faces (101) are identical and are stated herein to comprise an aerating configuration. By that is meant that they (101) have an abundance of spaces in them to allow air to pass through to fan the burning coals (300). Such configuration is sometimes referred to in the prior art as "foraminous", examples of which are various kinds of fire resistant screening material or what is sometimes referred to as "expanded metal". When either of the faces (101) is so configured, it is designated herein as an aerating heating bed face (111).

Optionally, one face (101) only may comprise an aerating configuration, the other (101) remaining uncut so as to permit its (101) surface to reflect heat back through the coals (300) and outward toward the food (400) thereby acquiring designation herein as a heating reflector plate (121). Since it is intended that food (400) be cooked only at one of the bed's faces (101) where such is the configuration, the rods (1) may then attached to it (100) in one-directional extension only. If the rods (1) are attached on two-directional extension in such a configured bed (100), it is feasible to cook with the bed horizontally disposed as further discussed ante. Because two-directional extension of the rods (1), simultaneous cooking at both faces and unimpeded airflow through the coals (300) are all advantageous factors in cooking, it is preferable that two opposing aerating faces (111) be installed rather than configuring one of the faces (101) as a reflector plate (121).

A base (2) is attached to the bottom (102) of the heating bed (100) in a manner which supports it (100) slightly off the ground. In the interests of simplicity and economy of manufacture, underlying legs which would otherwise support the bed (100) at a substantially elevated level are dispensed with. The base (2) comprises outward extensions of rodding or tubing along a plane generally parallel to that defined by the hanger rods (1) and, therefore, generally normal to the planes described by the heating bed faces (101).

The base (2) may comprise configuration generally like that of the hanger rods (1)—that is, with outward projections which terminate at a given point remote from the bed (100) and, preferably, with each extending limb attached at its (2) midsection along the bed's (100) lowest corners. Thus, the disposition of the base (2) would be that of a pair of limbs, each extending from one of the bed's (100) lower corners, a disposition which when considered with the hanger rods (1) provides a considerable degree of symmetry. Preferably, the base (2), like the rods (1), supra, is comprised of reinforcement rods.

Such H shaped configuration is not unknown to the prior art and figured considerably in devices intended to be turned upon their sides for horizontal bed cooking disposition. While emphasis here is upon avoiding such cooking orientation for health and other reasons, applicant recognizes an operator's choice to cook over horizontally disposed coals (300). Moreover, such configuration permits tipping the structure upon the lower parallel limbs of the base to facilitate lighting the coals. Although there is no requirement for it, if the outward extending limbs of such a configured base (2) comprise length substantially equal to that of the hanger rods (1), the cooker is provided with appropriate stability and tipping it for lighting or other purposes is easier to control.

In the interest of aesthetics, metal tubing formed into a rounded rectangle may be attached, if desired, to the bottom (102) of the heating bed (100) and disposed such that the elongated extremities of the rectangle project in a direction generally normal the faces (101). The term rounded rectangle merely denotes a rectangle whose corners are rounded off. Attachment is made generally at the midsections of the elongated sides of the rectangle so that the overall configuration of the base (2) would essentially be like that of the paired base rods described supra but instead of allowing them to terminate at ends, they are caused to join in the continuous rounded rectangular shape. Although not required, chrome tubing may be so formed for aesthetic purposes. The H shaped configuration is preferable by far, however, for reasons discussed herein, supra The food (400) is retained in a food clamping grill (200), a device well known in the prior art, usually a hinged and doubled over or folded wireform grating with a handle long enough to hold without discomfort from the heat of cooking. Its (200) folded sections are generally bound together to retain food (400) emplaced therein by means of a ring fastener. The projection of the hanger rods (1) as described supra provides grill (200) hanging sites at each of the heating bed's opposing aerating faces (111).

Where the cooking of small amounts of food (400) is concerned, it is often advantageous to employ a grill or wire basket considerably smaller then the traditional hand held food grill (200) so often otherwise used. While such a small container could in some cases be hung from but a single hanger rod (1), doing so would place it away from the bed's (100) heating area. In any event, it is often desired that as is done with the larger variety, the small grill or basket be positioned before the heat in two-point suspension. The invention, therefore comprises a span shortening hanger rod(3), which is the only unattached object in the entire combination.

The span shortening rod (3) is configured much the same as the attached hanger rods (1). While its (3) length may be sufficient to permit it (3) to extend outward from both aerating heating bed faces (111) simultaneously, it is preferred that it (3) be of single-directional configuration. Because it (3) is employed in connection with loads smaller than those of a full sized food grill (200) hung from opposing attached hanger rods (1), it (3) may be substantially shorter than those rods (1), preferably of the order of no more than five or six inches.

The span shortening hanger rod (3) is configured with a pair of opposing extensions (31, 32, respectively ante) which are configured to fit snugly the inside of the vertical heating bed's open top (104) along its (100) narrow dimension. These extensions (31, 32) project at right angles to the direction of the rod (1) itself. They (31, 32) may be emplaced by fitting them (31, 32) into the top (104) of the heating bed (100) to allow the rod itself (1) to project outward from the bed (100) in a direction generally normal to the bed's aerating face (111) and generally parallel the rods (1) which are attached to the bed (100).

The extensions (31, 32) may take the form either of a pair of opposing anchoring prongs (31) or a pair of opposing anchoring plates (32). The former (31) comprise a spear-like configuration which facilitates their emplacement into burning coals (300) near the top (104) of the bed (100). They (31, 32) are preferably also configured with flat sides which upon emplacement enhance engagement of the inside surface of the bed's faces (101). As the name infers, the latter extensions (32)—the pair of opposing anchoring plates (32)— comprise a considerably greater area of flatness thereon for even better engagement upon emplacement.

The inventor hereby claims:

1. A hangered barbeque assembly comprising a vertically disposed heating bed;

a pair of attached hanger rods;

an span shortening hanger rod; and a base;

the vertically disposed heating bed comprising in turn;

one or more aerating faces; and an open top;

the attached hanger rods being disposed normal each aerating face;

the span shortening hanger rod comprising in turn means for emplacement into the heating chamber's open top, comprising one of;

opposing anchor prongs; and opposing anchor plates;

whereby an operator may hang one or more food clamping grills of various sizes and at a selected position upon the assembly and barbeque the contents thereof.

2. The hangered barbeque assembly according to claim 1 wherein the number of aerating faces is two disposed in opposition to one another.

3. The hangered barbeque assembly according to claim 1 wherein the number of aerating faces is one and the vertically disposed heating bed comprises a reflector plate.

4. The hangered barbeque assembly according to claim 1 wherein a cross brace is attached transversely to and between the vertical heating bed's faces.

5. The hangered barbeque assembly according to claim 1 wherein the hanger rods and base comprise reinforcement rod composition and the aerating heating bed faces comprise expanded metal configuration.

* * * * *